US012531197B2

(12) United States Patent
Horie et al.

(10) Patent No.: US 12,531,197 B2
(45) Date of Patent: Jan. 20, 2026

(54) ELECTROMAGNETIC RELAY

(71) Applicant: OMRON Corporation, Kyoto (JP)

(72) Inventors: Ayata Horie, Kyoto (JP); Ryota Minowa, Kyoto (JP); Shinichi Ogawa, Kyoto (JP)

(73) Assignee: OMRON CORPORATION, Kyoto (JP)

(*) Notice: Subject to any disclaimer, the term of this patent is extended or adjusted under 35 U.S.C. 154(b) by 132 days.

(21) Appl. No.: 18/131,342

(22) Filed: Apr. 5, 2023

(65) Prior Publication Data

US 2023/0335362 A1 Oct. 19, 2023

(30) Foreign Application Priority Data

Apr. 13, 2022 (JP) ................................ 2022-066326

(51) Int. Cl.
*H01H 50/16* (2006.01)
*H01H 50/02* (2006.01)
*H01H 50/14* (2006.01)
*H01H 50/54* (2006.01)

(52) U.S. Cl.
CPC ............ *H01H 50/16* (2013.01); *H01H 50/02* (2013.01); *H01H 50/14* (2013.01); *H01H 50/546* (2013.01)

(58) Field of Classification Search
CPC ........ H01H 50/16; H01H 50/02; H01H 50/14; H01H 50/546; H01H 9/443; H01H 50/54; H01H 50/60; H01H 50/18
USPC .......................................................... 335/185
See application file for complete search history.

(56) References Cited

U.S. PATENT DOCUMENTS

| | | | |
|---|---|---|---|
| 2009/0114622 A1 | 5/2009 | Bush et al. | |
| 2011/0120844 A1 | 5/2011 | Hoffmann et al. | |
| 2014/0070908 A1 | 3/2014 | Jang | |
| 2019/0148095 A1* | 5/2019 | Minowa ................. | H01H 50/14 335/185 |
| 2019/0304726 A1 | 10/2019 | Ishikawa et al. | |

FOREIGN PATENT DOCUMENTS

| | | |
|---|---|---|
| JP | 2011-113974 A | 6/2011 |
| JP | 2012-104366 A | 5/2012 |
| JP | 2018-106880 A | 7/2018 |
| KR | 10-1323605 B1 | 11/2013 |

OTHER PUBLICATIONS

The Office Action for the corresponding Korean application No. 10-2023-0034334 issued on Sep. 30, 2024.
The Office Action for the corresponding Japanese application No. 2022-066326 issued on Oct. 14, 2025.

* cited by examiner

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a first fixed terminal, a movable contact piece, a contact case, a magnet, and a magnet holding member. The first fixed terminal includes a first fixed contact. The movable contact piece includes a first movable contact disposed to face the first fixed contact. The contact case includes a first fixed contact and a movable contact piece. The magnet generates a magnetic field inside the contact case. The magnet holding member is comprised of resin. The magnet holding portion includes a flexible portion. The magnet holding member holds the magnet as the flexible portion deforms.

7 Claims, 4 Drawing Sheets

ELECTROMAGNETIC RELAY

CROSS-REFERENCE TO RELATED APPLICATION

This application claims priority to Japanese Patent Application No. 2022-066326, filed Apr. 13, 2022. The contents of that application are incorporated by reference herein in their entirety.

FIELD

The present invention relates to an electromagnetic relay.

BACKGROUND

Conventionally, an electromagnetic relay is known that extends and extinguishes an arc generated at a contact using the magnetic force of a magnet. The magnet is attached to and held by a yoke that is fixed to a cover (see Japanese Patent Application Laid-Open No. 2012-104366).

SUMMARY

In the electromagnetic relay of Patent Document 1, the magnet is attached to and held by the yoke. That is, the magnet is not fixed to a contact case or a cover. Hence, upon receipt of an impact, the magnet may move, adversely affecting the operation of the electromagnetic relay.

An object of the present invention is to provide an electromagnetic relay in which a magnet is less likely to move with respect to a contact case.

An electromagnetic relay according to one aspect of the present invention includes a first fixed terminal, a movable contact piece, a contact case, a magnet, and a magnet holding member. The first fixed terminal includes a first fixed contact. The movable contact piece includes a first movable contact disposed to face the first fixed contact. The contact case is configured to house the first fixed contact and the movable contact piece. The magnet is configured to generate a magnetic field inside the contact case. The magnet holding member is comprised of resin. The magnet holding member includes a flexible portion. The magnet holding member is configured to hold the magnet as the flexible portion deforms.

In the electromagnetic relay, the magnet is held as the flexible portion of the magnet holding member deforms. That is, the magnet is held by the elastic force of the flexible portion that is elastically deformed. Thereby, the magnet becomes less likely to move with respect to the contact case. As a result, even when the electromagnetic relay receives an impact, the magnet is unlikely to move and adversely affect the operation of the electromagnetic relay. In addition, for example, as compared to the case where the magnet is fixed with a sealing member, the movement of the magnet can be decreased with a simple configuration, resulting in no increase in the manufacturing cost of the electromagnetic relay.

The magnet holding member may be fixed to the contact case. In this case, the magnet can be disposed in the vicinity of the contact case.

The magnet holding member may be integral with the contact case. In this case, the number of parts in the electromagnetic relay can be reduced.

The flexible portion of the magnet holding member may include a first wall extending from an outer surface of the contact case and a second wall extending from the outer surface of the contact case. The magnet may be sandwiched between the first wall and the second wall. In this case, a simple configuration holds the magnet.

The electromagnetic relay may further include an outer case outside the contact case. The magnet holding member may be fixed to the outer case. In this case, the outer case holds the magnet.

The magnet holding member may include a first wall extending from an inner surface of the outer case and a second wall extending from the inner surface of the outer case. The magnet may be sandwiched between the first wall and the second wall. In this case, a simple configuration holds the magnet.

The first movable contact may be disposed to face the first fixed contact in a first direction, the first direction including a contact direction in which the first movable contact approaches the first fixed contact and a separation direction in which the first movable contact moves away from the first fixed contact. The magnet may overlap the first fixed terminal when viewed from the first direction. In this case, the magnet is less likely to move with respect to the contact case in the electromagnetic relay where the magnet and the first fixed terminal overlap when viewed from the first direction.

The first movable contact may be disposed to face the first fixed contact in a first direction, the first direction including a contact direction in which the first movable contact approaches the first fixed contact and a separation direction in which the first movable contact moves away from the first fixed contact. The magnet holding member may hold the magnet in the first direction. In this case, the magnet holding member makes the magnet less likely to move in the first direction.

The electromagnetic relay may further include a second fixed terminal. The second fixed terminal may be disposed apart from the first fixed terminal. The second fixed terminal may include a second fixed contact. The movable contact piece may further include a second movable contact disposed to face the second fixed contact.

DETAILED DESCRIPTION

Figure 1:
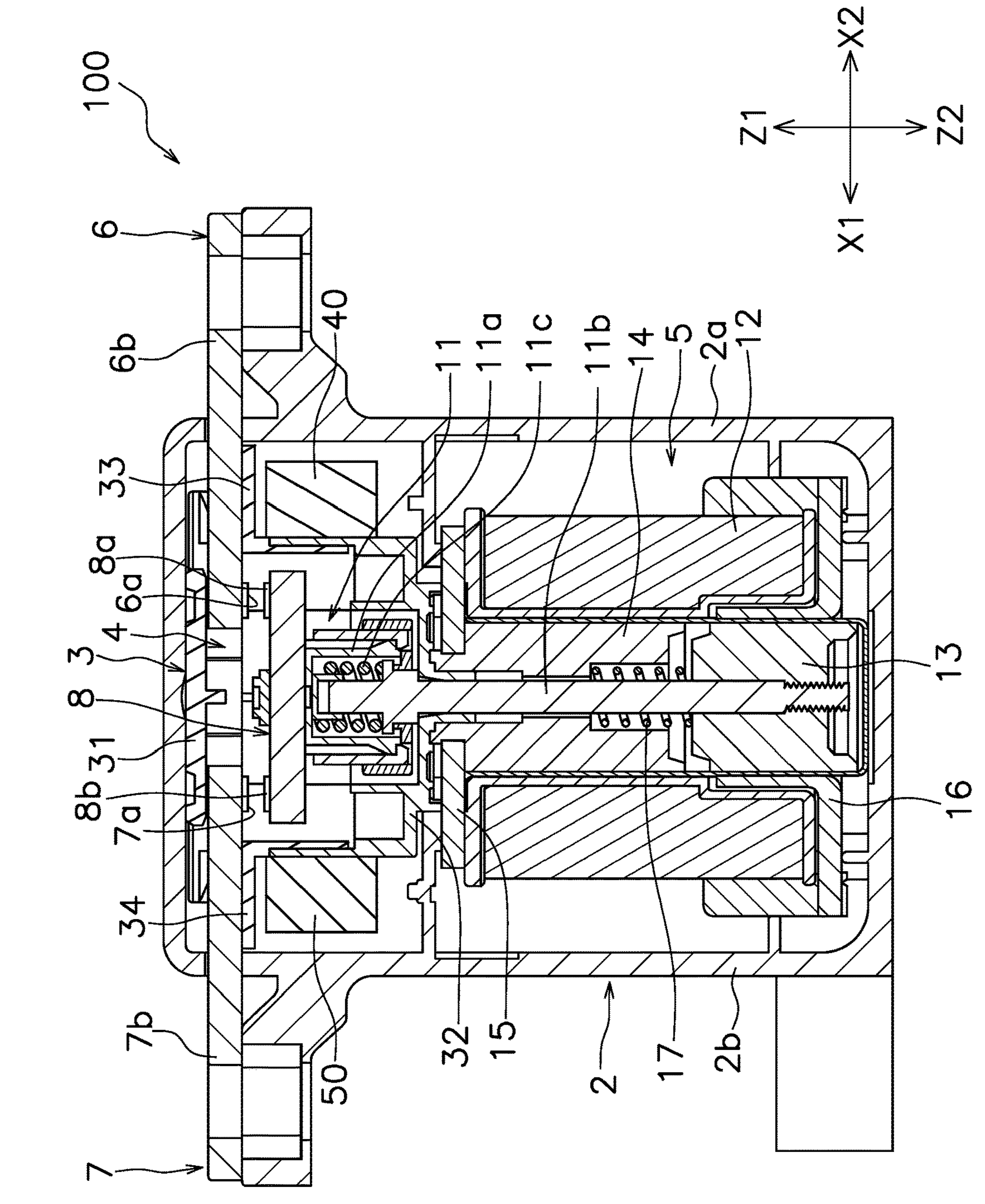
FIG. 1 is a cross sectional view of an electromagnetic relay.
Figure 2:
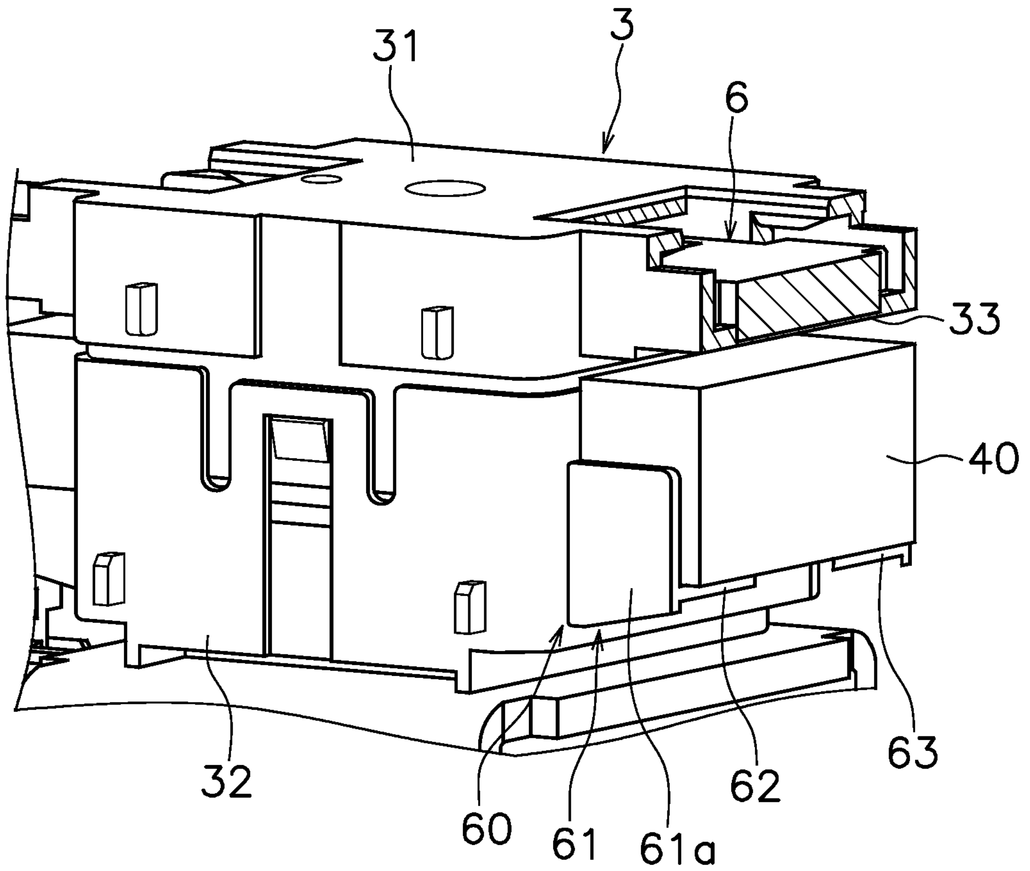
FIG. 2 is a perspective view of a first magnet and surrounding structure.
Figure 3:
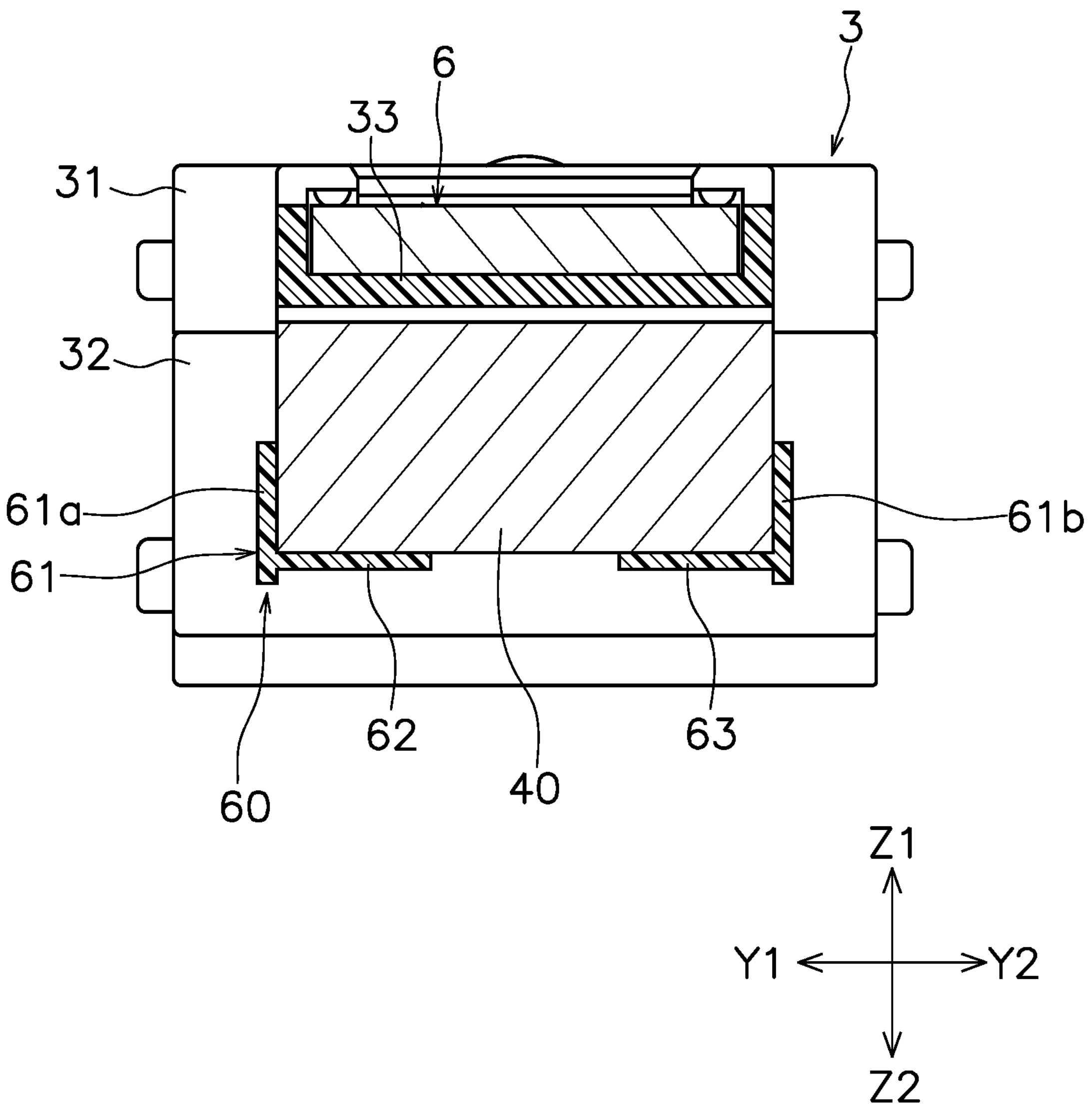
FIG. 3 is a cross sectional view of a first magnet and surrounding structure.

An embodiment of an electromagnetic relay 100 according to one aspect of the present invention will be described below with reference to the drawings. When referring to the drawings, description will be made on the assumption that the X1 direction is the leftward direction, the X2 direction is the rightward direction, the Y1 direction is the forward direction, the Y2 direction is the rearward direction, the Z1 direction is the upward direction, and the Z2 direction is the downward direction. The X1-X2 direction is defined as the left-right direction, the Y1-Y2 direction to be front-rear direction, and the Z1-Z2 direction to be the up-down direction. These directions are defined for convenience of description and do not limit the directions of arrangement of the electromagnetic relay 100.

As shown in FIG. 1, the electromagnetic relay 100 includes a case 2, a contact case 3, a contact device 4, and a driving device 5.

The case 2 has a substantially rectangular box shape and is comprised of an insulating material such as resin. The case 2 houses the contact case 3, the contact device 4 and the driving device 5. The case 2 is an example of an outer case.

The contact case 3 is disposed inside the case 2. The contact case 3 is located on the driving device 5. The contact case 3 is a substantially rectangular box in shape and is comprised of an insulating material such as resin.

The contact case 3 includes an upper case 31, a lower case 32, a first terminal support portion 33, and a second terminal support portion 34. The upper case 31 is open downward. The upper case 31 is located on the lower case 32. The upper case 31 is a separate body from the lower case 32. The upper case 31 is fixed to the lower case 32 by, for example, a snap-fitting. The lower case 32 is open upward. The lower case 32 is covered with the upper case 31 from above.

The first terminal support portion 33 and the second terminal support portion 34 are integral with the upper case 31. The first terminal support portion 33 protrudes from the upper case 31 to the right. The first terminal support portion 33 is open rightward. The second terminal support portion 34 protrudes to the left from the upper case 31. The second terminal support portion 34 is open leftward.

The contact device 4 includes a first fixed terminal 6, a second fixed terminal 7, and a movable contact piece 8.

The first fixed terminal 6 and the second fixed terminal 7 are tabular and comprised of a conductive material. The first fixed terminal 6 and the second fixed terminal 7 extend in the left-right direction. The first fixed terminal 6 and the second fixed terminal 7 extend across the contact case 3 to the outside. The first fixed terminal 6 and the second fixed terminal 7 are spaced apart from each other in the left-right direction. The first fixed terminal 6 and the second fixed terminal 7 are held in the upper case 31 of the contact case 3.

The first fixed terminal 6 is fixed to the first terminal support portion 33 by press-fitting. The first fixed terminal 6 protrudes from the right wall 2*a* of the case 2 to the outside. There is provided a gap between the first fixed terminal 6 and the right wall 2*a* of the case 2, and the first fixed terminal 6 is not fixed to the case 2. Note that the first fixed terminal 6 may be configured to be held by the case 2.

The first fixed terminal 6 includes a first fixed contact 6*a* and a first external connection portion 6*b*. The first fixed contact 6*a* is housed in the contact case 3. The first fixed contact 6*a* is disposed on the bottom surface of the first fixed terminal 6. The first external connection portion 6*b* is arranged outside the case 2. The first external connection portion 6*b* is configured to be connected to an external terminal (not shown) such as a bus bar.

The second fixed terminal 7 is symmetrical to the first fixed terminal 6 in configuration. The second fixed terminal 7 is located to the left of the first fixed terminal 6. The second fixed terminal 7 is fixed to the second terminal support portion 34 by press-fitting. The second fixed terminal 7 protrudes from the left wall 2*b* of the case 2 to the outside. There is provided a gap between the second fixed terminal 7 and the left wall 2*b* of the case 2, and the second fixed terminal 7 is not fixed to the case 2. Note that the second fixed terminal 7 may be configured to be held by the case 2.

The second fixed terminal 7 includes a second fixed contact 7*a* and a second external connection portion 7*b*. The second fixed contact 7*a* is housed in contact case 3. The second fixed contact 7*a* is arranged on the bottom surface of the second fixed terminal 7. The second external connection portion 7*b* is arranged outside the case 2. The second external connection portion 7*b* is configured to be connected to an external terminal (not shown) such as a bus bar.

The movable contact piece 8 is housed in the contact case 3. The movable contact piece 8 has a plate shape elongated in one direction and is comprised of a conductive material. The movable contact piece 8 extends in the left-right direction. The movable contact piece 8 is movable in the up-down direction.

The movable contact piece 8 includes a first movable contact 8*a* and a second movable contact 8*b*. The first movable contact 8*a* and the second movable contact 8*b* are arranged on the top surface of the movable contact piece 8. The first movable contact 8*a* is arranged to face the first fixed contact 6*a* in a first direction, the first direction including a contact direction in which the first movable contact 8*a* approaches the first fixed contact 6*a* and a separation direction in which the first movable contact 8*a* moves away from the first fixed contact 6*a*. In the present embodiment, the up-down direction is an example of a first direction, the upward direction is an example of a contact direction, and the downward direction is an example of a separation direction. The second movable contact 8*b* is arranged to face the second fixed contact 7*a* in the up-down direction.

The driving device 5 is disposed inside the case 2. The driving device 5 is configured to move the movable contact piece 8 in the up-down direction. The driving device 5 includes a movable mechanism 11, a coil 12, a movable iron core 13, a fixed iron core 14, yokes 15 and 16, and a return spring 17.

The movable mechanism 11 is coupled to the movable contact piece 8. The movable mechanism 11 includes a holder 11*a*, a drive shaft 11*b*, and a contact spring 11*c*. The holder 11*a* holds the movable contact piece 8. The holder 11*a* moves integrally with the movable contact piece 8. The drive shaft 11*b* extends in the up-down direction. The drive shaft 11*b* is connected to the holder 11*a* so as to be movable relative to the holder 11*a* in the up-down direction. The contact spring 11*c* is arranged between the holder 11*a* and the drive shaft 11*b*. The contact spring 11*c* urges the movable contact piece 8 upward via the holder 11*a*.

The coil 12, when excited upon application of a voltage, generates an electromagnetic force to move the movable iron core 13 upward. The movable iron core 13 is fixed to the drive shaft 11*b* so as to be movable integrally therewith. The fixed iron core 14 is arranged above movable iron core 13 so as to face the movable iron core 13. The yokes 15 and 16 are arranged to surround the coil 12. The yoke 15 has a substantially U-shape and is connected to the fixed iron core 14. The yoke 16 is arranged below the coil 12 and connected to the yoke 15. The return spring 17 urges the movable iron core 13 downward.

The electromagnetic relay 100 is operated in the conventional manner, and only brief description thereof will be given below. FIG. 1 shows a state in which the coil 12 is not energized. In this state, the first movable contact 8*a* is separated from the first fixed contact 6*a*, and the second movable contact 8*b* is separated from the second fixed contact 7*a*. When the coil 12 is excited, the movable iron core 13 is attracted to the fixed iron core 14 and moves upward together with the drive shaft 11*b*. As the drive shaft 11*b* moves, the movable contact piece 8 moves upward via the contact spring 11*c*, so that the first movable contact 8*a* contacts the first fixed contact 6*a*, and the second movable contact 8*b* contacts the second fixed contact 7*a*. Upon termination of the voltage application to the coil 12, the return spring 17 urges the drive shaft 11*b* to move downward together with the movable iron core 13. As a result, the movable contact piece 8 moves downward, the first movable contact 8*a* moves away from the first fixed contact 6*a*, and the second movable contact 8*b* is separated from the second fixed contact 7*a*.

The electromagnetic relay 100 further includes a first magnet 40, a second magnet 50, a first magnet holding member 60, and a second magnet holding member (not shown). The first magnet 40 is an example of a magnet. The first magnet holding member 60 is an example of a magnet holding member.

The first magnet 40 and the second magnet 50 generate a magnetic field inside the contact case 3. The first magnet 40 and the second magnet 50 are each a permanent magnet. The first magnet 40 and the second magnet 50 each have a cuboid shape.

The first magnet 40 is arranged inside the case 2. The first magnet 40 is arranged to the right of the contact case 3. The first magnet 40 is arranged in contact with the contact case 3. The first magnet 40 is positioned below the first fixed terminal 6 and overlaps with the first fixed terminal 6 when viewed from the up-down direction. The first magnet 40 is positioned below the first terminal support portion 33 and overlaps the first terminal support portion 33 when viewed from the up-down direction. The first magnet 40 is held in the first magnet holding member 60. The first magnet 40 is fixed to the first magnet holding member 60 by press-fitting.

The second magnet 50 is arranged inside the case 2. The second magnet 50 is arranged to the left of the contact case 3. The second magnet 50 is arranged in contact with the contact case 3. The second magnet 50 is disposed to face the first magnet 40 in the left-right direction. The second magnet 50 is positioned below the second fixed terminal 7 and overlaps the second fixed terminal 7 when viewed from the up-down direction. The second magnet 50 is positioned below the second terminal support portion 34 and overlaps the second terminal support portion 34 when viewed from the up-down direction.

The first magnet holding member 60 is comprised of resin. The first magnet holding member 60 is fixed to contact case 3. In the present embodiment, the first magnet holding member 60 is integral with the contact case 3. The first magnet holding member 60 is arranged to the right of the contact case 3.

The first magnet holding member 60 includes a flexible portion 61 and supports 62, 63. The first magnet holding member 60 uses deformation of the flexible portion 61 to hold the first magnet 40. In the present embodiment, the flexible portion 61 is deformable in the front-rear direction and sandwiches the first magnet 40 in the front-rear direction to hold it.

The flexible portion 61 includes a first wall 61*a* and a second wall 61*b*. The first wall 61*a* and the second wall 61*b* extend from the outer surface of the contact case 3. The first wall 61*a* and the second wall 61*b* extend rightward from the right wall of the lower case 32 of the contact case 3. The first wall 61*a* and the second wall 61*b* extend in the direction perpendicular to the front-rear direction.

The first wall 61*a* and the second wall 61*b* are deformable in the front-rear direction. The first wall 61*a* and the second wall 61*b* are arranged to face each other in the front-rear direction. The distance from the rear surface of the first wall 61*a* to the front surface of the second wall 61*b* is smaller than the dimension of the first magnet 40 in the front-rear direction.

For example, the first magnet 40 is inserted between the first wall 61*a* and the second wall 61*b* from above. The first magnet 40 is held by the elastic force of the first wall 61*a* and the second wall 61*b* of the flexible portion 61 elastically deforming. Specifically, when the first magnet 40 is held by the first magnet holding member 60, the first wall 61*a* is deformed forward and the second wall 61*b* is deformed backward. That is, when the first magnet 40 is held by the first magnet holding member 60, the first wall 61*a* and the second wall 61*b* are deformed apart from each other. As a result, the first magnet 40 is sandwiched between the first wall 61*a* and the second wall 61*b* in the front-rear direction, and the first magnet 40 is fixed to the contact case 3.

The supports 62 and 63 support the bottom surface of first magnet 40. The support 62 is connected to the first wall 61*a*. The support 63 is connected to the second wall 61*b*. The support 62 and the support 63 are separated from each other in the front-rear direction. The support 62 may be separated from the first wall 61*a*. The support 63 may be separated from the second wall 61*b*. The supports 62 and 63 may have a shape for supporting the right surface of the first magnet 40.

The second magnet holding portion is symmetrical to the first magnet holding member 60 in configuration. The second magnet holding portion is arranged to the left of the contact case 3. The second magnet holding portion holds the second magnet 50. The second magnet holding portion has the same configuration as the first magnet holding member 60, and description thereof is omitted.

In the electromagnetic relay 100, the first magnet 40 is held by deformation of the flexible portion 61 of the first magnet holding member 60. That is, the first magnet 40 is held by the elastic force that is generated when the flexible portion 61 elastically deforms. Thereby, the first magnet 40 becomes less likely to move with respect to the contact case 3. As a result, even when the electromagnetic relay 100 receives an impact, the first magnet 40 is unlikely to move and adversely affect the operation of the electromagnetic relay 100. In addition, for example, as compared to the case where the first magnet 40 is fixed with a sealing member, the movement of the first magnet 40 can be decreased with a simple configuration, resulting in no increase in the manufacturing cost of the electromagnetic relay 100.

An embodiment of the electromagnetic relay according to one aspect of the present invention have been described above, but the present invention is not limited to the above embodiment, and various modifications are possible without departing from the gist of the invention.

The configuration of contact case 3 may be changed. The contact case 3 may consist of a single member. The configuration of the contact device 4 may be changed. For example, the first fixed terminal 6 and the second fixed terminal 7 may be cylindrical. The configuration of the driving device 5 may be changed. The driving device 5 may be configured to push the movable iron core 13 downward. In this case, the movable contact piece 8 is arranged above the first fixed terminal 6 and the second fixed terminal 7.

The electromagnetic relay 100 may further include a yoke to be connected to the first magnet 40 and the second magnet 50.

The first magnet holding member 60 may be a separate member from the contact case 3. The supports 62, 63 may be eliminated. The first magnet holding member 60 may include a support for supporting the center bottom surface of the first magnet 40 in the front-rear direction.

In the embodiment described above, the flexible portion 61 deforms in the front-rear direction to hold the first magnet 40. However, the flexible portion 61 may be deformed in any direction. For example, the flexible portion 61 may be configured to hold the first magnet 40 by deforming in the up-down direction or in the front-rear direction. In addition, the first magnet 40 may be sandwiched between two members. For example, the first magnet 40 may be sandwiched between the upper case 31 and the lower case 32 in the up-down direction. In this case, a configuration is possible in which the first wall 61*a* of the flexible portion 61 is positioned in the upper case 31, the second wall 61*b* of the flexible portion 61 is positioned in the lower case 32, so that the first magnet 40 is sandwiched between the first wall 61*a* and the second wall 61*b* in the up-down direction.

The first magnet holding member 60 may have a shape for guiding the first magnet 40. For example, in the above embodiment, at least one of the first wall 61*a* and the second wall 61*b* of flexible portion 61 may be configured to guide the first magnet 40 in the left-right direction. Also, the tip inner surface of the first wall 61*a* and/or the tip inner surface of the second wall 61*b* may be tapered. In this case, when the first magnet is placed on the first magnet holding member 60, the magnet can be inserted easily between the first wall 61*a* and the second wall 61*b*.

Figure 4:
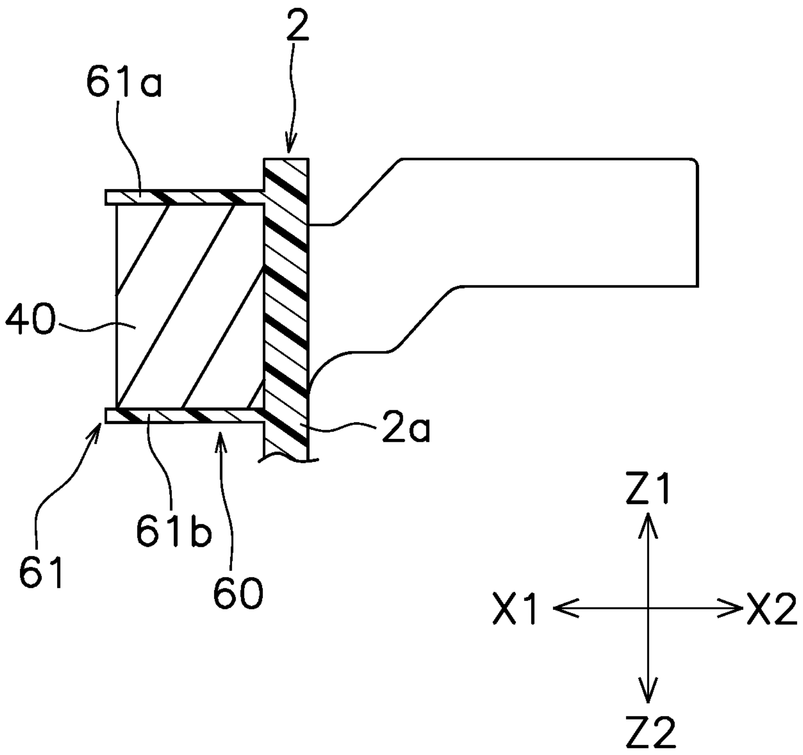
FIG. 4 is a cross sectional view of a first magnet and surrounding structure according to a modification.

The first magnet holding member 60 may be fixed to a member other than the contact case 3. For example, as shown in FIG. 4, the first magnet holding member 60 may be fixed to the case 2 (an example of an outer case). The first magnet holding member 60 may be integral with the case 2. In the example shown in FIG. 4, the first wall 61*a* and the second wall 61*b* extend leftward from an inner surface of the case 2, and the first magnet 40 is sandwiched between the first wall 61*a* and the second wall 61*b* in the up-down direction.

The position of the first magnet 40 may be changed. The first magnet 40 may be placed in front of or behind the contact case 3. For example, with the first magnet 40 in front of the contact case 3, the first magnet holding member 60 may be disposed on the front wall of the contact case 3.

REFERENCE NUMERALS

- 2 Case (Example of outer case)
- 3 Contact case
- 6 First fixed terminal
- 6*a* First fixed contact
- 7 Second fixed terminal
- 7*a* Second fixed contact
- 40 First magnet (Example of magnet)
- 60 First magnet holding member (Example of magnet holding member)
- 61*a* First wall
- 61*b* Second wall
- 100 Electromagnetic relay

The invention claimed is:

1. An electromagnetic relay, comprising:

a first fixed terminal including a first fixed contact;

a movable contact piece including a first movable contact disposed to face the first fixed contact;

a contact case configured to house the first fixed contact and the movable contact piece;

a magnet configured to generate a magnetic field inside the contact case; and a magnet holding member comprised of resin, the magnet holding member including a flexible portion, the magnet holding member configured to hold the magnet as the flexible portion deforms, wherein the flexible portion of the magnet holding member includes a first wall extending from an outer surface of the contact case and a second wall extending from the outer surface of the contact case, the second wall facing the first wall in a first direction, the magnet is sandwiched between the first wall and the second wall, and an internal dimension from the first wall to the second wall when the magnet is not sandwiched between the first wall and the second wall is smaller than a dimension of the first magnet in the first direction.

2. The electromagnetic relay according to claim 1, wherein the magnet holding member is fixed to the contact case.

3. The electromagnetic relay according to claim 2, wherein the magnet holding member is integral with the contact case.

4. The electromagnetic relay according to claim 1, wherein the first movable contact is disposed to face the first fixed contact in a first direction, the first direction including a contact direction in which the first movable contact approaches the first fixed contact and a separation direction in which the first movable contact moves away from the first fixed contact, and the magnet overlaps the first fixed terminal when viewed from the first direction.

5. The electromagnetic relay according to claim 1, further comprising:

a second fixed terminal including a second fixed contact, the second fixed terminal spaced from the first fixed terminal, wherein the movable contact piece further includes a second movable contact disposed to face the second fixed contact.

6. An electromagnetic relay, comprising:

a first fixed terminal including a first fixed contact;

a movable contact piece including a first movable contact disposed to face the first fixed contact;

a contact case configured to house the first fixed contact and the movable contact piece;

a magnet configured to generate a magnetic field inside the contact case; and a magnet holding member comprised of resin, the magnet holding member including a flexible portion, a first support configured to support a bottom surface of the magnet, and a second support configured to support the bottom surface of the magnet, the magnet holding member configured to hold the magnet as the flexible portion deforms, wherein the flexible portion of the magnet holding member includes a first wall extending from an outer surface of the contact case and a second wall extending from the outer surface of the contact case, the second wall facing the first wall in a first direction, the magnet is sandwiched between the first wall and the second wall, the first and second supports extend in a direction intersecting the flexible portion, and the second support is spaced apart from the first support in the first direction.

7. The electromagnetic relay according to claim 6, wherein the first support extends from the first wall in the first direction, and the second support extends from the second wall in the first direction.

* * * * *